(12) United States Patent
Gaspar

(10) Patent No.: US 6,892,174 B1
(45) Date of Patent: May 10, 2005

(54) ARRANGEMENT FOR TESTING A NETWORK DEVICE BY INTERFACING A LOW SPEED EMULATION SYSTEM WITH HIGH SPEED CPU

(75) Inventor: Harand Gaspar, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 916 days.

(21) Appl. No.: 09/847,427

(22) Filed: May 3, 2001

(51) Int. Cl.[7] .............................................. G06F 9/455
(52) U.S. Cl. ..................... 703/23; 370/412; 370/395.53
(58) Field of Search ..................... 703/23, 26; 370/390, 370/401, 412, 395.53, 395.62

(56) References Cited

U.S. PATENT DOCUMENTS 5,649,167 A * 7/1997 Chen et al. .................... 703/23
5,953,335 A    9/1999 Erimli et al. ................ 370/390

OTHER PUBLICATIONS

Paterson et al., M. Contention Resolution with Bounded Delay, 36th Annual Symposium on Foundations of Computer Science, IEEE, Oct. 1995, pp. 104–113.*

Liu, M.–K. Using Negative Stuffing Retiminig for Circuit Emulation in a Packet Switching Network., IEEE Transactions on Communications, vol. 40, No. 9, Sep. 1992, pp. 1522–1531.*

Neves et al., J.L. Synthesizing Distributed Buffer Clock Trees for High Performance ASICs, Seventh Annual IEEE International ASIC Conference and Exhibit, Sep. 1994, pp. 126–129.*

* cited by examiner

Primary Examiner—Russell Frejd
(74) Attorney, Agent, or Firm—Manelli Denison & Selter PLLC; Leon R. Turkevich

(57) ABSTRACT

A system is provided for delaying a ready signal from an emulation system, configured for emulating a network device, to a central processing unit (CPU) for initiating an access cycle of the CPU. The system includes an emulation system and a central processing unit (CPU). The emulation system is configured for operating according to an emulation clock having a maximum speed substantially less than a prescribed operating speed of the CPU. The emulation system includes programmable device configured for receiving a ready signal from the emulation system, delaying the ready signal based on the emulation clock, and sending the delayed ready signal to the CPU based on the emulation clock. The delayed ready signal enables the emulation system to complete the access cycle of the CPU prior to the CPU initiating processing of subsequent instructions.

6 Claims, 1 Drawing Sheet

ARRANGEMENT FOR TESTING A NETWORK DEVICE BY INTERFACING A LOW SPEED EMULATION SYSTEM WITH HIGH SPEED CPU

BACKGROUND OF THE INVENTION

1. Field of the Invention

The present invention relates to testing of network devices such as integrated network switches configured for switching data packets between subnetworks.

2. Background Art

Local area networks use a network cable or other media to link stations on the network. Each local area network architecture uses a media access control (MAC) enabling network interface devices at each network node to access the network medium.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received layer 2 type data packet may include a VLAN (virtual LAN) tagged frame according to IEEE 802.1p (802.1D) protocol that enables the network switch to perform more advanced switching operations. For example, the VLAN tag may specify another subnetwork (via a router) or a prescribed group of stations.

Currently, in testing network logic using an emulation system configured for emulating a multiport switch having switch ports, the emulation system sends signals to a Central Processing Unit (CPU). Typically, the CPU is operating at a speed much greater than the speed of the emulation system. For example, the CPU may be running at 40 MHz with the emulation system running at 250 KHz. If the multiport switch is running on the CPU clock, a ready (RDY) signal typically is used to signal the presence of valid data on a read/write (R/W) bus during a read operation or the latching of data from the R/W bus during a write operations. However, in the emulation system, the multiport switch is running on a much slower emulation clock. Due to the difference in emulation system and CPU speed, a RDY signal from the emulation system will release the CPU access, causing the CPU to continue to the next instruction even though the emulation system has not completed the access cycle. Hence, the substantial difference in clock rates prevent reliable synchronous operations (e.g., write access or read access) between the CPU and the emulation system, preventing a test designer from testing the emulated system properly.

SUMMARY OF THE INVENTION

There is a need for an arrangement that provides an interface between a low speed emulation system and a high speed CPU which gates a ready signal from the emulation system and delays the ready signal which is passed to the CPU.

These and other needs are attained by the present invention, where a method is provided for delaying a ready signal from an emulation system, configured for emulating a network device, to a central processing unit (CPU) for initiating an access cycle of the CPU. The emulation system is configured for operating according to an emulation clock having a maximum speed substantially less than a prescribed operating speed of the CPU. The method provides a programmable device. A ready signal sent from the emulation system is received by the programmable device. The ready signal is delayed in the programmable device based on the emulation clock. The delayed ready signal is sent to the CPU based on the emulation clock. The delayed ready signal enables the emulation system to complete the access cycle of the CPU prior to the CPU initiating processing of subsequent instructions.

Another aspect of the present invention provides a system for delaying a ready signal from an emulation system, configured for emulating a network device, to a central processing unit (CPU) for initiating an access cycle of the CPU. The system includes an emulation system and a central processing unit (CPU). The emulation system is configured for operating according to an emulation clock having a maximum speed substantially less than a prescribed operating speed of the CPU. The emulation system includes programmable device configured for receiving a ready signal from the emulation system, delaying the ready signal based on the emulation clock, and sending the delayed ready signal to the CPU based on the emulation clock. The delayed ready signal enables the emulation system to complete the access cycle of the CPU prior to the CPU initiating processing of subsequent instructions.

Hence, gating of the ready signal ensures that the emulation system will complete the access cycle prior to the CPU continuing to the next instruction.

Additional advantages and novel features of the invention will be set forth in part in the description which follows and in part will become apparent to those skilled in the art upon explanation of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
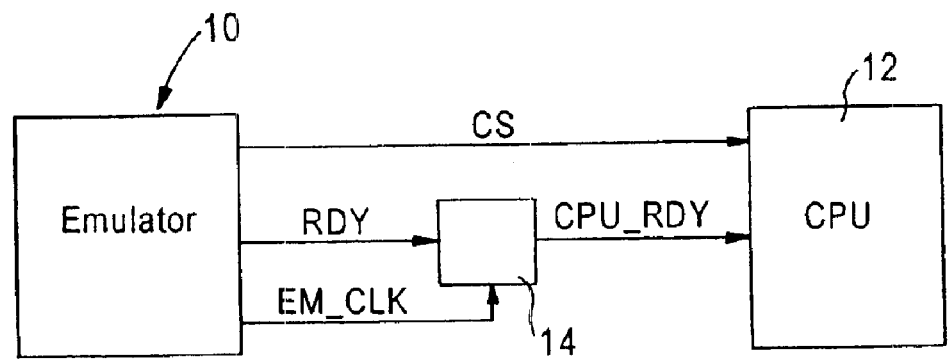
FIG. 1 is a block diagram of a system configured for gating a ready signal sent from an emulation system and passed to a CPU, in accordance with an embodiment of the present invention

FIG. 1 is a block diagram illustrating a testing system configured for testing a network device, for example, an integrated (i.e., single chip) network device 10. The disclosed network device 10 is illustrated as an emulation system configured for emulating a multiport switch having switch ports that include a media access controller (MAC), enabling transmission and reception of layer 2 type data packets between network stations. With reference to FIG. 1, the emulation system 10 transmits a chip select signal (CS), a ready signal (RDY) and a clock signal (EM_CLK). A Central Processing Unit (CPU) 12 is provided to receive signals from the emulation system 10. The emulation system 10 is configured to operate according to an emulation clock having a maximum speed substantially less than a prescribed speed of the CPU. As noted above, for example, the emulation system 10 typically runs at a speed of 250 KHz and the CPU typically runs at a speed of 40 MHz. This speed difference causes the RDY signal to release the CPU access thereby causing the CPU to continue to the next instruction before the emulation system 10 has competed the access cycle. In other words, when the RDY signal is asserted sometime after the slow clock, the CPU immediately detects the RDY signal, de-asserts a data strobe (DS#) signal (which indicates that a data bus signal contains valid data during a write cycle or that the CPU has sampled the data bus signal during a read cycle) and then the CPU may start a new cycle. This may happen within one or two slow clock cycles. Assuming the CPU has started a new cycle and has asserted the DS# signal again, in the next slow clock edge, the emulation system 10 will detect this DS# signal and determine that the previous cycle has not yet stopped. On the other hand, the CPU will detect that the RDY signal is still asserted and may assume that the new cycle has succeeded. In this case, the emulation system 10 would assume one read or write access but the CPU will assume two cycles have been completed.

Figure 2:
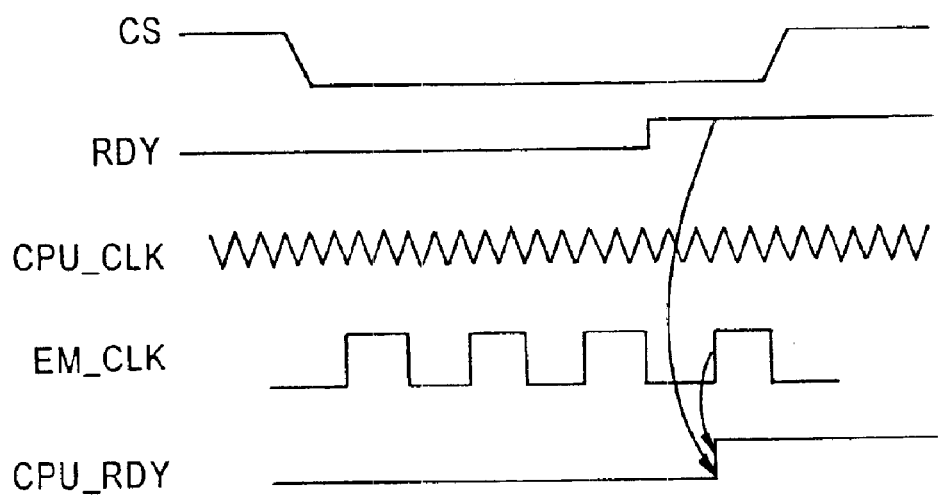
FIG. 2 is a timing diagram illustrating signals used during an access cycle in the system of FIG. 1, and showing a delaying of a ready signal passed to the CPU.

In accordance with the disclosed embodiment, to prevent early release of the CPU access, a programmable device 14 (e.g., a field programmable gate array) is provided between the emulation system 10 and CPU 12 to gate the RDY signal. Thus, the device 14 gates the RDY signal received from the emulation system 10 to delay the RDY signal. As shown in FIGS. 1 and 2, the emulation clock (EM_CLK) is used to clock the device 14 and the device 14 passes the delayed ready signal (CPU_RDY) to the CPU 12. Thus, the CPU_RDY signal is delayed (by many CPU clocks) a time sufficient to enable the emulation system 10 to complete the access cycle of the CPU prior to the CPU processing other instructions.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of delaying a ready signal from an emulation system, configured for emulating a network device, to a central processing unit (CPU) for initiating an access cycle of the CPU, the emulation system being configured for operating according to an emulation clock having a maximum speed substantially less than a prescribed operating speed of the CPU, the method comprising:

providing a programmable device, receiving, at the programmable device, a ready signal sent from the emulation system, delaying the ready signal in the programmable device based on the emulation clock; and sending the delayed ready signal to the CPU based on the emulation clock, the delayed ready signal enabling the emulation system to complete the access cycle of the CPU prior to the CPU initiating processing of subsequent instructions.

2. The method of claim 1, wherein the emulation system is configured for emulating a multiport switch having switch ports.

3. The method of claim 2, wherein the CPU is configured to operate at approximately 40 MHz and the emulation clock is configured to operate at approximately 250 KHz.

4. A system for delaying a ready signal from an emulation system, configured for emulating a network device, to a central processing unit (CPU) for initiating an access cycle of the CPU, the system comprising:

an emulation system, a central processing unit (CPU), the emulation system being configured for operating according to an emulation clock having a maximum speed substantially less than a prescribed operating speed of the CPU, and a programmable device configured for receiving a ready signal from the emulation system, delaying the ready signal based on the emulation clock, and sending the delayed ready signal to the CPU based on the emulation clock, the delayed ready signal enabling the emulation system to complete the access cycle of the CPU prior to the CPU initiating processing of subsequent instructions.

5. The system of claim 4, wherein the emulation system is configured for emulating a multiport switch having switch ports.

6. The system of claim 5, wherein the CPU is configured to operate at approximately 40 MHz and the emulation clock is configured to operate at approximately 250 KHz.

* * * * *